US012677974B2

(12) United States Patent
Rana et al.

(10) Patent No.: US 12,677,974 B2
(45) Date of Patent: *Jul. 14, 2026

---

(54) MACHINE FOR COOKING A DOSE OF RAW PASTA IN A CONTAINER

(71) Applicant: PASTIFICIO RANA S.P.A., San Giovanni Lupatoto (IT)

(72) Inventors: Gian Luca Rana, San Giovanni Lupatoto (IT); Alberto Luigi Cologni, Osio Sopra (IT); Mattia De Santis, Paullo (IT)

(73) Assignee: PASTIFICIO RANA S.P.A. (IT)

( * ) Notice: Subject to any disclaimer, the term of this patent is extended or adjusted under 35 U.S.C. 154(b) by 922 days.

This patent is subject to a terminal disclaimer.

(21) Appl. No.: 17/603,520

(22) PCT Filed: Apr. 16, 2020

(86) PCT No.: PCT/IB2020/053616
§ 371 (c)(1),
(2) Date: Oct. 13, 2021

(87) PCT Pub. No.: WO2020/212909
PCT Pub. Date: Oct. 22, 2020

(65) Prior Publication Data
US 2022/0183497 A1      Jun. 16, 2022

(30) Foreign Application Priority Data
Apr. 16, 2019      (IT) ........................ 102019000005912

(51) Int. Cl.
*A47J 27/04*      (2006.01)
*A47J 27/00*      (2006.01)
(Continued)

(52) U.S. Cl.
CPC ............... *A47J 27/04* (2013.01); *A47J 27/16* (2013.01); *A47J 27/18* (2013.01); *A47J 36/32* (2013.01);
(Continued)

(58) Field of Classification Search
CPC ............ A47J 2027/006; A47J 2027/043; A47J 2202/00; A47J 2203/00; A47J 27/04;
(Continued)

(56) References Cited

U.S. PATENT DOCUMENTS 4,233,891 A      11/1980   Schindler et al.
5,279,212 A  *    1/1994   Coupe ..................... A23L 3/003
                                                          99/330
(Continued)

FOREIGN PATENT DOCUMENTS

EP            0273323  A2  *  7/1988
JP        H06304067  A  *  11/1994
(Continued)

OTHER PUBLICATIONS

Office Action issued in counterpart Japanese Patent Application No. 2021-561783.
(Continued)

*Primary Examiner* — Edward F Landrum
*Assistant Examiner* — Adam M Eckardt
(74) *Attorney, Agent, or Firm* — The Belles Group, P.C.

(57)      ABSTRACT

A machine for cooking a dose of pasta in a container has a hot water supply pipe to selectively inject hot water into the container above the dose of pasta; a steam supply pipe to selectively inject steam into the container independently of the water injection; and a dispenser comprising at least one first nozzle connected to the hot water supply pipe to deliver
(Continued)

hot water into the container and at least one second nozzle connected to the steam supply pipe to deliver steam into the container.

16 Claims, 2 Drawing Sheets

(51) Int. Cl.
| | |
|---|---|
| *A47J 27/16* | (2006.01) |
| *A47J 27/18* | (2006.01) |
| *A47J 36/32* | (2006.01) |
| *B65D 81/34* | (2006.01) |
| *F22B 1/28* | (2006.01) |
| *H05B 1/02* | (2006.01) |

(52) U.S. Cl.
CPC ............ *B65D 81/3415* (2013.01); *F22B 1/28* (2013.01); *H05B 1/0244* (2013.01); *A47J 2027/006* (2013.01); *A47J 2027/043* (2013.01); *A47J 2202/00* (2013.01); *A47J 2203/00* (2013.01); *B65D 2581/3404* (2013.01); *H05B 2203/005* (2013.01)

(58) Field of Classification Search
CPC .. A47J 27/16; A47J 27/18; A47J 36/32; A47J 2027/008; A47J 31/4489; A47J 27/002; A47J 29/02; A47J 31/54; A47J 36/06; A47J 36/24; A47J 44/00; A47J 27/004; A47J 27/08; A47J 27/0802; A47J 27/0804; A47J 27/09; A47J 27/10; A47J 27/14; A47J 27/21016; A47J 27/21166; A47J 31/401; A47J 36/2483; A47J 36/321; A47J 37/044; A47J 37/1228; A47J 39/003; A47J 39/006; A47J 43/0772; B65D 2581/3404; B65D 81/3415; B65D 75/38; B65D 77/04; B65D 81/34; B65D 83/771; F22B 1/28; F22B 1/284; F22B 27/04; H01B 1/0244; H01B 2203/005; A23L 5/13; A23L 7/111; A23L 15/00; A23L 7/113; A23L 5/10; A23L 5/11; A23L 5/15; A23L 5/40; A23L 7/109; A23L 7/196; A23L 7/1975; F24C 15/327; F24C 14/005; F24C 15/003; F24C 15/14; F24C 9/00; A23V 2002/00; A23V 2300/38; B08B 9/093; B08B 2209/08; A21B 3/04; A21C 11/16; A23B 2/003; A23B 2/25; A23B 2/425; A23B 2/82; A23B 4/0053; F16L 25/10; F22G 1/10; F25B 21/04; F25B 2321/021; F26B 11/181; G05B 19/0426; G05B 2219/2643; G07F 13/10; G07F 17/0064; G07F 17/0078; G07F 9/105; H05B 1/0244; H05B 2203/005; Y02P 60/85; Y10S 294/902

See application file for complete search history.

(56) References Cited

U.S. PATENT DOCUMENTS

| | | | | |
|---|---|---|---|---|
| 9,113,741 | B2 * | 8/2015 | Foser | A47J 27/18 |
| 2002/0178932 | A1 * | 12/2002 | Cai | A47J 36/24 |
| | | | | 99/516 |
| 2003/0051606 | A1 * | 3/2003 | Cusenza | A47J 27/18 |
| | | | | 99/357 |
| 2004/0131738 | A1 * | 7/2004 | Holm | A47J 27/16 |
| | | | | 426/511 |
| 2010/0151092 | A1 * | 6/2010 | Sus | A47J 29/02 |
| | | | | 426/510 |
| 2011/0104349 | A1 * | 5/2011 | Foser | A47J 27/18 |
| | | | | 99/330 |
| 2011/0256287 | A1 | 10/2011 | Sus et al. | |
| 2014/0026761 | A1 * | 1/2014 | Bartoli | A47J 31/369 |
| | | | | 426/112 |
| 2018/0199748 | A1 | 7/2018 | Patel et al. | |
| 2020/0178724 | A1 * | 6/2020 | Kihara | A47J 31/44 |

FOREIGN PATENT DOCUMENTS

| | | | |
|---|---|---|---|
| JP | 07087915 A | * | 4/1995 |
| JP | 2003070644 A | | 3/2003 |
| WO | WO02/096252 A1 | | 12/2002 |
| WO | 2019207509 A1 | | 10/2019 |

OTHER PUBLICATIONS

European Office Action 20726234.6 Issued Oct. 20, 2022.
Office Action issued in counterpart European Application No. 207262364.6.
Office Action issued in counterpart Japanese Application No. 2021-561783.

* cited by examiner

MACHINE FOR COOKING A DOSE OF RAW PASTA IN A CONTAINER

CROSS-REFERENCE TO RELATED APPLICATIONS

This application is a U.S. national stage application under 35 U.S.C. § 371 of PCT Application No. PCT/IB2020/053616, filed Apr. 16, 2020, which claims priority from Italian Patent Application No. 102019000005912 filed Apr. 16, 2019, the entire disclosure of the aforementioned priority applications are incorporated herein by reference in their entireties.

TECHNICAL FIELD

The present invention relates to a machine for cooking a dose of food.

In particular, the present invention relates to a machine configured to cook a dose of raw pasta in a container. The machine is configured to be used both in the food service field, for example in a restaurant or in a bar, and at home, without because of this loosing in generality.

BACKGROUND ART

Generally, machines to cook a dose of food comprise a steam generator and a nozzle to feed steam into a container containing the dose of food.

In particular, document US 2010/0151092 discloses an apparatus for cooking food in a container comprising a steam generator and a wand having a nozzle to supply steam.

Currently known cooking machines are not capable of cooking a dose of pasta in the short amounts of time required by the quick-service food field and, at the same time, of preserving the organoleptic qualities of the dose of pasta.

Furthermore, currently known cooking machines are scarcely flexible, as they are not able to change the cooking procedure based on the particular needs.

DISCLOSURE OF INVENTION

The object of the present invention is to provide a machine that can reduce the drawbacks of the prior art.

According to the present invention, there is provided a machine for cooking a dose of raw pasta in a container, the machine comprising:

a hot water supply pipe to selectively inject hot water into the container above the dose of pasta;

a steam supply pipe to selectively inject steam into the container independently of the water injection; and a dispenser comprising at least one first nozzle connected to the hot water supply pipe to deliver hot water into the container and at least one second nozzle (23) connected to the steam supply pipe to deliver steam into the container.

In this way, one single nozzle needs to be positioned relative to the container and the steam and the water can be supplied simultaneously and/or according to any sequence so as to optimize the times and the quality of the cooking of different types of pasta.

In particular, the dispenser is shaped so as to define a lid for said container.

In this way, the dispenser also serves as a lid, so that the relative positioning between the dispenser and the container allows for the definition of a closed compartment, into which hot water and steam are injected and which is kept at a light overpressure relative to the ambient pressure on the outside of the container thanks to the lid.

In particular, the machine comprises a boiler, which houses a heat exchanger, and a cold water supply pipe to supply the heat exchanger and the boiler; said hot water supply pipe connecting said heat exchanger to the first nozzle; and said steam supply pipe connecting the boiler to the second nozzle.

In this way, the boiler provides the heat that allows water to evaporate and heats the water on the inside of the heat exchanger.

In particular, said boiler comprises a tank and a plurality of electrical resistors housed in said boiler, in particular each electrical resistor can be selectively operated independently.

In this way, it is possible to control the number of electrical resistors flown through by an electric current so as to reduce the quantity of heat transmitted to the water on the inside of the tank.

In particular, the boiler comprises a level sensor to acquire a first signal related to the water level in the boiler; the cold water supply pipe comprising a switching solenoid valve to selectively supply the boiler as a function of said first signal.

In this way, the switching solenoid valve can be operated so as to selectively convey the flow of cold water coming from the cold water supply pipe to the heat exchanger or to the boiler depending on the particular needs.

In particular, if the level of water on the inside of the boiler goes below a predetermined threshold, the switching solenoid valve is operated so as to convey the flow of cold water to the boiler.

In particular, the cold water supply pipe comprises, in sequence, a connection to with a water supply and/or a water tank and a pump.

In this way, the pump provides a hydraulic head in order to allow the cold water to supply the heat exchanger and/or the boiler.

More in detail, the cold water supply pipe comprises a filter for water filtration.

In this way, the water of the cold water supply pipe is filtered so as to eliminate impurities and prevent the components of the machine from being damaged.

In particular, the hot water supply pipe comprises a first solenoid valve configured to selectively supply hot water to the first nozzle.

In this way, the injection of hot water into the container can be controlled.

In particular, the first solenoid valve is configured to evacuate hot water from the hot water supply pipe.

In this way, the temperature of the water injected into the container can be adjusted.

In particular, the hot water supply pipe comprises a temperature sensor configured to emit a second signal related to the temperature in the hot water supply line.

Thanks to the temperature sensor, it is possible to obtain a measure of the temperature of the water in the hot water supply pipe so as to adjust the temperature of the water injected into the container.

In particular, the steam supply pipe comprises a second solenoid valve configured to selectively supply steam to the second nozzle.

In this way, the injection of steam into the container can be controlled.

In particular, the second solenoid valve is configured to evacuate steam from the steam supply pipe.

In this way, it is possible to adjust the pressure and the temperature of the steam injected into the container.

In particular, the steam supply pipe comprises a pressure sensor configured to emit a third signal related to the steam pressure in the steam supply pipe.

Thanks to the pressure sensor, it is possible to obtain a measure of the pressure of the steam in the steam supply pipe so as to adjust the properties of the steam injected into the container.

In particular, it is possible to determine the temperature of the steam in the steam supply pipe based on the measure of the steam pressure. Therefore, it is possible to adjust the temperature of the steam injected into the container.

In particular, the machine comprises a control unit configured to control the hot water supply pipe and the steam supply pipe independently of each other; and a user interface connected to the control unit to program the control of the hot water supply pipe and steam supply pipe.

In this way, the control unit is capable of automatically handling the cooking operations of the dose of pasta.

In particular, the control unit is configured to control the pump, the switching solenoid valve, the electrical resistors, the first and the second three-way solenoid valves and to receive signals from the pump, from the temperature sensor and from the pressure sensor.

More in detail, thanks to the present invention, the control unit is capable of controlling the injection of hot water into the container simultaneously with the injection of steam into the container.

Furthermore, thanks to the user interface, a human operator can manually set the cooking parameters, which comprise, for example, the time interval during which the injection of hot water or steam into the container takes place and the sequence of injection of hot water and steam into the container.

In particular, the control unit comprises a microprocessor; and a memory configured to store a plurality of different cooking procedures corresponding to a plurality of different recipes for cooking a dose of pasta.

Thanks to the microprocessor, the control unit is capable of programming and controlling, through complex control logics, the cooking operations of the dose of pasta.

Furthermore, thanks to the memory, it is possible to store new recipes and chose a recipe from the plurality of stored recipes for cooking the dose of pasta depending on the particular needs.

Another object of the present invention is to provide a system for cooking a dose of raw pasta, the system comprising the machine as described above and a container, which comprises a base wall, a lateral wall and an opening opposite to the base wall and delimited by an edge; wherein the maximum distance between two points belonging to the lateral wall is greater than the distance between the base wall and the edge of the opening, in particular the maximum distance between two points belonging to the lateral wall is greater than twice the distance between the base wall and the edge of the opening.

Thanks to the system for cooking a dose of pasta, the dose of pasta contained inside the container can be wetted with hot water in a homogeneous and widespread manner so as to facilitate the cooking of the dose of pasta.

BRIEF DESCRIPTION OF THE DRAWINGS

Further features and advantages of the present invention will be apparent from the following description of a non-limiting embodiment thereof, with reference to the attached figures, wherein.

BEST MODE FOR CARRYING OUT THE INVENTION

Figure 1:
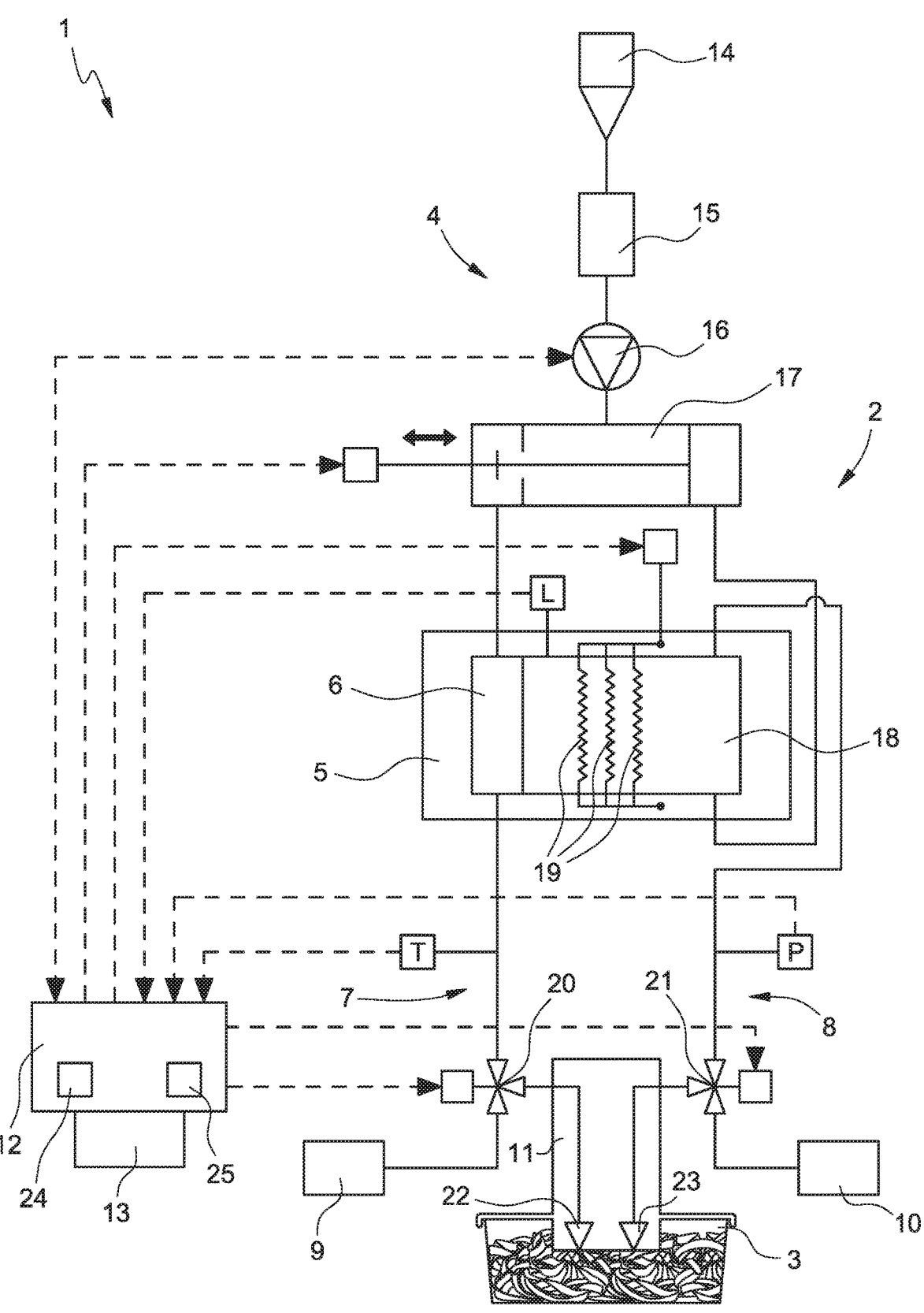
FIG. 1 is a schematic representation of the system for cooking a dose of raw pasta.

With reference to FIG. 1, number 1 indicates, as a whole, a system 1 for cooking a dose of pasta.

The system 1 comprises a machine 2 for cooking a dose of raw pasta and a container 3 configured to contain the dose of pasta. The dose of pasta comprises a plurality of unitary pasta elements arranged inside the container 3 in such a way that there are spaces between the unitary elements.

The machine 2 comprises a cold water supply pipe 4; a boiler 5, which is hydraulically connected to the cold water supply pipe 4 and houses a heat exchanger 6; a hot water supply pipe 7; a steam supply pipe 8; a hot water discharge 9; a steam discharge 10; a dispenser 11; a control unit 12; and a user interface 13.

The cold water supply pipe 4 comprises, in sequence, a connection 14 to a water supply network, which ensures a basically unlimited supply of cold water; a filter 15, which is configured to ensure the filtration of the water coming from the water supply network in order to eliminate the impurities thereof; a pump 16, which is configured to provide a head that is sufficient to allow water to flow inside the machine 2; and a switching solenoid valve 17, which is configured to selectively supply the boiler 5 or the heat exchanger 6.

According to a variant of the preferred embodiment, which is not shown in the attached Figures, the connection 14 is replaced by a water tank configured to contain water.

The boiler 5 comprises a tank 18, a plurality of electrical resistors 19 and a level sensor L, which is configured to emit a signal related to the level of water in the boiler 5.

In particular, if the level of water on the inside of the boiler 5 falls below a predetermined threshold, the switching solenoid 17 valve is operated so as to convey the flow of cold water to the boiler 5 to refill it with cold water.

The switching solenoid valve 17 is configured to convey cold water to the boiler 5 until a predetermined maximum level of water inside the boiler 5 is reached.

The boiler 5 is supplied by the cold water supply pipe 4 with cold water, which is introduced into a lower portion of the boiler 5, and, in turn, supplies with steam the steam supply pipe 8, which is hydraulically connected to the boiler 5 through an opening arranged in an upper portion of the tank 18.

The heat exchanger 6 is supplied with cold water by the cold water supply pipe 4 and, in turn, supplies the hot water supply pipe 7 with hot water.

In the example shown in FIG. 1, the boiler 5 comprises three electrical resistors 19, which are electrically connected in parallel to one another and can be operated in an independent manner, so as to adjust the quantity of heat transmitted to the water contained in the tank 18.

The hot water supply pipe 7 hydraulically connects the heat exchanger 6 to the dispenser 11 and comprises a temperature sensor T, which is configured to emit a first signal related to the temperature in the hot water supply pipe 7, and a solenoid valve 20, which is arranged downstream of the temperature sensor T and is configured to selectively supply hot water to the dispenser 11 and, if necessary, evacuate water from the hot water supply pipe 7 depending on the temperature value measured by the temperature sensor T.

More in detail, if the temperature value measured by the temperature sensor T exceeds a predetermined threshold, the solenoid valve 20 is operated so as to convey the flow of hot water towards the hot water discharge 9.

In this way, the temperature of the hot water injected into the container 3 is adjusted so as to be comprised between 94° C. and 100° C., preferably between 96° C. and 98° C.

The steam supply pipe 8 hydraulically connects the boiler 5 to the dispenser 11 and comprises a pressure sensor P, which is configured to emit a signal related to the pressure in the steam supply pipe 8, and a solenoid valve 21, which is arranged downstream of the pressure sensor P and is configured to selectively supply steam to the dispenser 11 and, if necessary, evacuate steam from the steam supply pipe 8 depending on the signal related to the steam pressure.

In particular, when the pressure value measured by the pressure sensor P exceeds a predetermined threshold, the solenoid valve 21 is operated so as to convey the flow of steam towards the steam discharge 10.

In this way, the stem pressure inside the steam supply pipe 8 is adjusted so as to be comprised between 1.1 bar and 3 bar, preferably between 1.1 bar and 1.5 bar.

The dispenser 11 comprises a nozzle 22, which is connected to the hot water supply pipe 7 so as to deliver hot water to the container 3, and at least one nozzle 23, which is connected to the steam supply pipe 8 so as to deliver steam to the container 3.

The dispenser 11 is sized so as to define a lid for the container 3, which is arranged under the dispenser 11.

The control unit 12 comprises a microprocessor 24, which is configured to control the cooking operations of the dose of pasta.

According to a preferred embodiment, a PLC is integrated in the microprocessor 24.

The term "PLC" means a Programmable Logic Controller. More in detail, the "PLC" is a digital processor configured to handle and solve control and automation problems in industrial processes.

In particular, the control unit 12 is configured to control the pump 16, the switching solenoid valve 17, the electrical resistors 19 and the solenoid valves 20 and 21 based on the signals received from the pump 16, from the temperature sensor T, from the pressure sensor P and from the level sensor L.

According to a preferred embodiment, the control unit 12 is configured to control the injection of hot water into the container 3 independently of the injection of steam into the container 3.

In a particular embodiment, the control unit 12 is capable of controlling the injection of hot water into the container 3 simultaneously with the injection of steam into the container 3.

Furthermore, the control unit 12 comprises a memory 25, which is configured to store a plurality of different cooking procedures corresponding to a plurality of different recipes for cooking a dose of pasta of different types in terms of configuration, geometry and composition.

The user interface 13 is connected to the control unit 12 so as to program the control of the hot water supply pipe 7 and of the steam supply pipe 8.

In particular, the user interface 13 is configured to allow a human operator to manually set the cooking parameters, such as, for example, the time interval during which the injection of hot water or steam into the container 3 takes place or the sequence of injection of hot water and steam into the container 3, and to store this information in the memory 25.

More in detail, the human operator, through the user interface 13, can select a particular recipe from the plurality of recipes stored in the memory 25 or can enter a new recipe to be stored in the memory 25.

Figure 2:
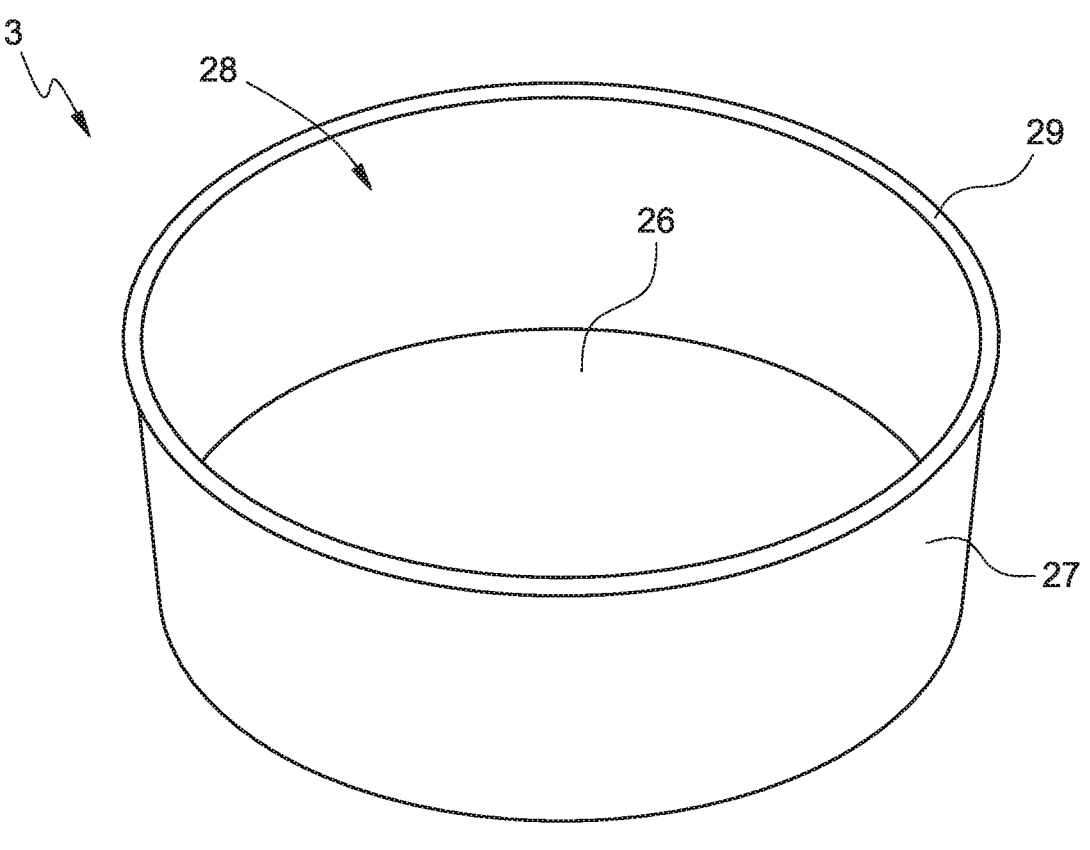
FIG. 2 is a perspective view of a container of the system for cooking a dose of raw pasta of FIG. 1.
Figure 3:
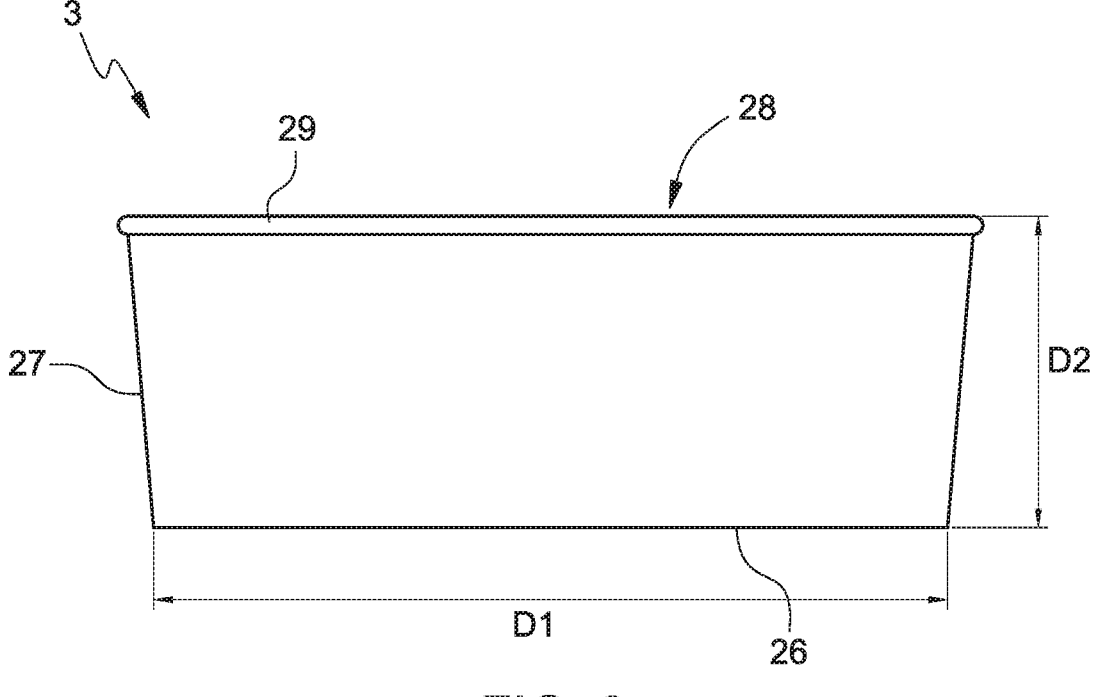
FIG. 3 is a side elevation view of the container of FIG. 2.

With reference to FIGS. 2 and 3, the container 3 comprises a base wall 26, a lateral wall 27 and an opening 28 opposite to the base wall 26; wherein the maximum distance between two points belonging to the lateral wall 27 along the base wall 26 is greater than the distance between the base wall 26 and the edge 29 of the opening 28.

In particular, with reference to FIG. 3, the maximum distance D1 between two points of the lateral wall 27 along the base wall 26 is greater than twice the distance D2 between the base wall 26 and the edge 29 of the opening 28.

In other words, the container 3 has a horizontal dimension which is greater than twice its height.

In the example shown in FIGS. 2 and 3, the container 3 has a base wall 26 with a circular shape and a slightly flared lateral wall 27. In this configuration, the diameter of the base wall 26 is greater than twice the distance between the base wall 26 and the edge 29 of the opening 28.

It is evident that variations can be made to the present invention without departing from the scope of protection of the appended claims.

The invention claimed is:

1. A machine for cooking a dose of raw pasta in a container, the machine comprising:
   a hot water supply pipe to selectively inject hot water into the container above the dose of pasta;
   a steam supply pipe to selectively inject steam into the container independently of the hot water injection; and
   a dispenser configured to be positioned on an opening of the container and shaped so as to define a lid closing the opening such that, when positioned on the opening, the dispenser and the container define a closed compartment maintained at an overpressure relative to ambient pressure, the dispenser comprising at least one first nozzle carried by the dispenser and connected to the hot water supply pipe to deliver hot water into the container above the dose of pasta and at least one second nozzle carried by the dispenser and connected to the steam supply pipe to deliver steam into the container above the dose of pasta.

2. The machine as claimed in claim 1, wherein the first nozzle and the second nozzle project from an underside of the dispenser toward an interior of the container.

3. The machine as claimed in claim 1, and comprising a boiler, inside which is placed a heat exchanger, and a cold water supply pipe to supply the heat exchanger and the boiler; the said hot water supply pipe connecting the said heat exchanger with the first nozzle; and the said steam supply pipe connecting the boiler with the second nozzle.

4. The machine as claimed in claim 3, wherein the said boiler comprises a tank and a plurality of electrical resistors housed in the said boiler, in particular each electrical resistor can be selectively operated independently.

5. The machine as claimed in claim 3, wherein the boiler-comprises a level sensor to acquire a first signal related to the water level in the boiler; the cold water supply pipe comprising a switching solenoid valve to selectively supply the boiler as a function of the said first signal.

6. The machine as claimed in claim 3, wherein the cold water supply pipe comprises a connection with a water supply and/or a water tank and a pump.

7. The machine as claimed in claim 3, wherein the cold water supply pipe comprises a filter for water filtration.

8. The machine as claimed in claim 1, wherein the hot water supply pipe comprises a first solenoid valve configured to selectively supply hot water to the first nozzle.

9. The machine as claimed in claim 8, wherein the first solenoid valve is configured to evacuate hot water from the hot water supply pipe.

10. The machine as claimed in claim 1, wherein the hot water supply pipe comprises a temperature sensor configured to emit a second signal related to the temperature in the hot water supply line.

11. The machine as claimed in claim 1 wherein the steam supply pipe comprises a second solenoid valve configured to selectively supply steam to the second nozzle.

12. The machine as claimed in claim 11, wherein the second solenoid valve is configured to evacuate steam from the steam supply pipe.

13. The machine as claimed in claim 1, wherein the steam supply pipe comprises a pressure sensor configured to emit a third signal related to the steam pressure in the steam supply pipe.

14. The machine as claimed in claim 1, and comprising a control unit configured to control the hot water supply pipe and steam supply pipe independently of each other; and a user interface connected to the control unit to program the control of the hot water supply pipe and steam supply pipe.

15. The machine as claimed in claim 14, wherein the control unit comprises a microprocessor; and a memory configured to store a plurality of different cooking procedures corresponding to a plurality of different recipes for cooking a dose of pasta.

16. System for cooking a dose of raw pasta, the system comprising the machine as claimed in claim 1 and a container, which comprises a base wall, a lateral wall and an opening opposite to the base wall and bounded by an edge; wherein the maximum distance between two points belonging to the lateral wall is greater than the distance between base wall and the edge of the opening, in particular the maximum distance between two points belonging to the lateral wall is greater than twice the distance between the base wall and the edge of the opening.

* * * * *